US010300318B2

(12) United States Patent
Lucas et al.

(10) Patent No.: US 10,300,318 B2
(45) Date of Patent: May 28, 2019

(54) FIRE SUPPRESSION SYSTEM WITH MULTI-DIRECTIONAL PASS THROUGH NOZZLE

(71) Applicant: United Technologies Corporation, Farmington, CT (US)

(72) Inventors: James L. Lucas, Hamden, CT (US); Steven C. Lee, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 193 days.

(21) Appl. No.: 15/416,773

(22) Filed: Jan. 26, 2017

(65) Prior Publication Data

US 2018/0207461 A1 Jul. 26, 2018

(51) Int. Cl.
A62C 35/68 (2006.01)
A62C 3/08 (2006.01)
B05B 1/14 (2006.01)
F02C 7/25 (2006.01)
F01D 25/24 (2006.01)
A62C 31/05 (2006.01)

(52) U.S. Cl.
CPC ............... *A62C 35/68* (2013.01); *A62C 3/08* (2013.01); *B05B 1/14* (2013.01); *F01D 25/24* (2013.01); *F02C 7/25* (2013.01); *A62C 31/05* (2013.01)

(58) Field of Classification Search
CPC ........... A62C 35/68; A62C 3/08; A62C 31/05; B05B 1/14; F01D 25/24; F02C 7/25
USPC ....... 169/9, 11, 16, 49, 54, 62; 239/548, 565
See application file for complete search history.

(56) References Cited

U.S. PATENT DOCUMENTS

| 2,340,006 | A | 1/1944 | Graham et al. | |
|---|---|---|---|---|
| 2,385,825 | A | 10/1945 | Anders et al. | |
| 8,820,045 | B2 | 9/2014 | DeDe et al. | |
| 9,482,113 | B2 | 11/2016 | Graily et al. | |
| 2010/0032176 | A1* | 2/2010 | McIntosh | A61M 5/204 169/46 |
| 2010/0236796 | A1* | 9/2010 | Chattaway | A62C 37/44 169/46 |
| 2016/0010862 | A1* | 1/2016 | Balandier | F23R 3/007 60/753 |
| 2018/0099169 | A1 | 4/2018 | Lucas et al. | |

FOREIGN PATENT DOCUMENTS

GB 520714 A 5/1940

OTHER PUBLICATIONS

EP search report for EP18152414.1 dated May 24, 2018.

* cited by examiner

*Primary Examiner* — Steven J Ganey
(74) *Attorney, Agent, or Firm* — O'Shea Getz P.C.

(57) ABSTRACT

A fire suppression system for a gas turbine engine includes a fire suppressant delivery circuit, a first nozzle and a multi-directional nozzle. The fire suppressant delivery circuit includes and extends between an upstream inlet and a downstream distal end. The first nozzle is fluidly coupled with the fire suppressant delivery circuit and is disposed at the downstream distal end. The multi-directional nozzle is fluidly coupled with the fire suppressant delivery circuit and is configured serially inline between the upstream inlet and the first nozzle.

19 Claims, 9 Drawing Sheets

FIRE SUPPRESSION SYSTEM WITH MULTI-DIRECTIONAL PASS THROUGH NOZZLE

BACKGROUND OF THE INVENTION

1. Technical Field

This disclosure relates generally to an aircraft system and, more particularly, to a fire suppression system for a gas turbine engines.

2. Background Information

A modern aircraft may utilize one or more turbofan propulsion systems, each powered by a gas turbine engine. A typical turbofan propulsion system includes a nacelle with an inner structure surrounding a core of the gas turbine engine within a core compartment. This core compartment may be classified as a "Designated Fire Zone" as it contains ignition sources and the potential for flammable fluid leakage. A fire suppression system therefore is typically included and arranged with the nacelle. A nozzle of the fire suppression system may be positioned on a lower surface of a pylon structure, and configured to direct fire extinguishing agent towards the engine and its core in response to a fire. Delivery of adequate amounts of fire extinguishing agent is important to the fire suppression system. The fire suppression system therefore will typically include multiple single stream delivery nozzles, where each nozzle is configured to discharge fire suppressant (fire extinguishing agent) from a single orifice in a single direction.

SUMMARY OF THE DISCLOSURE

According to an aspect of the present disclosure, a fire suppression system is provided for a gas turbine engine. This fire suppression system includes a fire suppressant delivery circuit, a first nozzle and a multi-directional nozzle. The fire suppressant delivery circuit includes and extends between an upstream inlet and a downstream distal end. The first nozzle is fluidly coupled with the fire suppressant delivery circuit and is disposed at the downstream distal end. The multi-directional nozzle is fluidly coupled with the fire suppressant delivery circuit and is configured serially inline between the upstream inlet and the first nozzle According to another aspect of the present disclosure, an assembly of a fire suppression system is provided for a gas turbine engine. The fire suppression system includes a first fluid line and a second fluid line. The assembly includes a multi-directional pass-through nozzle. This nozzle includes a tubular upstream fitting, a tubular downstream fitting, a coupling nut and a plurality of nozzle orifices. The upstream fitting includes an upstream fitting inlet and an upstream fitting outlet. The upstream fitting inlet is configured to be fluidly coupled with and receive fire suppressant from the first fluid line. The downstream fitting includes a downstream fitting inlet and a downstream fitting outlet. The downstream fitting outlet is configured to be fluidly coupled with and provide a portion of the fire suppressant to the second fluid line. The coupling nut attaches the downstream fitting to the upstream fitting. The downstream fitting inlet is fluidly coupled with the upstream fitting outlet. The nozzle orifices extend through the coupling nut. Each of the nozzle orifices is fluidly coupled with an inner bore of the multi-directional nozzle.

According to still another aspect of the present disclosure, an assembly is provided that includes a gas turbine engine and a fire suppression system. The fire suppression system includes a fire suppressant delivery circuit, a first nozzle and a multi-directional nozzle. The first nozzle and the multi-directional nozzle are configured to direct fire suppressant towards components of the gas turbine engine. The fire suppressant delivery circuit includes and extends between an upstream inlet and a downstream distal end. The first nozzle is fluidly coupled with the fire suppressant delivery circuit and is disposed at the downstream distal end. The multi-directional nozzle is fluidly coupled with the fire suppressant delivery circuit and is configured between the upstream inlet and the first nozzle.

The fire suppressant delivery circuit may include a first fluid line and a second fluid line. The multi-directional nozzle may be fluidly coupled between a downstream end of the first fluid line and an upstream end of the second fluid line. The first nozzle may be fluidly coupled with a downstream end of the second fluid line.

The multi-directional nozzle may be configured as a pass-through joint between and may be attached to the first fluid line and the second fluid line.

The first nozzle may be configured as a multi-directional nozzle.

The first nozzle may be configured as a single direction nozzle.

A third nozzle may be included and fluidly coupled with the fire suppressant delivery circuit. The third nozzle may be configured serially inline between the multi-directional nozzle and the first nozzle.

The third nozzle may be configured as a multi-directional nozzle.

A third nozzle may be included and fluidly coupled with the fire suppressant delivery circuit. The third nozzle may be configured downstream of the multi-directional nozzle and in parallel with the first nozzle.

The multi-direction nozzle may be disposed within a cavity. The multi-direction nozzle may include a plurality of nozzle orifices. Each of the nozzle orifices may be configured to direct fire suppressant out of the multi-direction nozzle and into the cavity along a discrete trajectory.

The multi-directional nozzle may include a tubular upstream fitting, a tubular downstream fitting, a coupling nut and a plurality of nozzle orifices. The tubular upstream fitting may include an upstream fitting inlet and an upstream fitting outlet. The upstream fitting inlet may be fluidly coupled with the upstream inlet of the fire suppressant delivery circuit. The tubular downstream fitting may include a downstream fitting inlet and a downstream fitting outlet that may be fluidly coupled with the first nozzle. The coupling nut may be configured to attach the downstream fitting to the upstream fitting. The downstream fitting inlet may be fluidly coupled with the upstream fitting outlet. The nozzle orifices may extend through the coupling nut. Each of the nozzle orifices may be fluidly coupled with an inner bore of the multi-directional nozzle.

The inner bore may be formed by the downstream fitting and may extend between the downstream fitting inlet and the downstream fitting outlet.

A first of the nozzle orifices may be oriented at an angle between about five degrees and about ninety degrees relative to a longitudinal centerline of the inner bore.

An annulus may be formed between the downstream fitting and the coupling nut. The annulus may be fluidly coupled between the nozzle orifices and the inner bore.

The inner bore may be formed by the downstream fitting and may extend between the downstream fitting inlet and the downstream fitting outlet.

A nacelle may be included and configured to house the gas turbine engine. A pylon structure may also be included and configured to attach the gas turbine engine and the nacelle to an airframe of an aircraft. The gas turbine engine may be configured as a turbofan engine or a turbojet engine. The fire suppression system may be disposed at least within a cavity formed between the nacelle and the gas turbine engine.

The foregoing features and the operation of the invention will become more apparent in light of the following description and the accompanying drawings.

DETAILED DESCRIPTION OF THE DISCLOSURE

Figure 1:
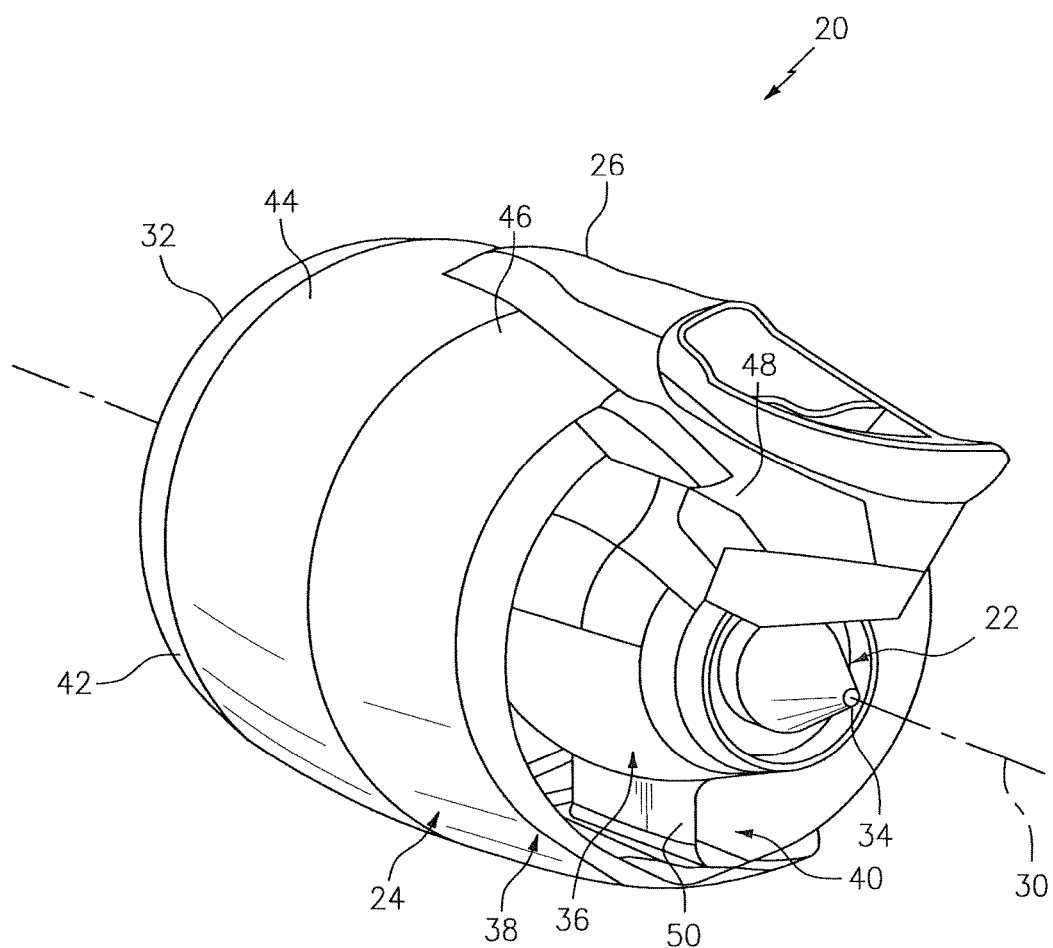
FIG. 1 is a perspective illustration of an aircraft propulsion system.

FIG. 1 is a perspective illustration of an aircraft propulsion system 20 for an aircraft such as, but not limited to, a commercial airliner. This aircraft propulsion system 20 includes a gas turbine engine 22 (discussed below with reference to FIG. 11), a nacelle 24 and a pylon structure 26. This pylon structure 26 is configured to attach and structurally tie the gas turbine engine 22 and the nacelle 24 to an airframe of the aircraft; e.g., a wing, fuselage, etc.

The nacelle 24 is configured to house and provide an aerodynamic cover for the gas turbine engine 22. The nacelle 24 extends along an axial centerline 30 from a forward airflow inlet 32 of the nacelle 24 towards an aft end 34 of the gas turbine engine 22. The nacelle 24 of FIG. 1 includes an inner nacelle structure 36 (sometimes referred to as an "inner fixed structure") and an outer nacelle structure 38. The outer nacelle structure 38 circumscribes the inner nacelle structure 36, thereby forming an aft portion of a bypass gas path 40 radially therebetween. The outer nacelle structure 38 of FIG. 1 includes a nacelle inlet structure 42, a set of fan cowls 44 (one such cowl visible in FIG. 1) and an aft structure 46; e.g., a translating sleeve. This aft structure 46 may be configured as part of or include a thrust reverser system; however, the present disclosure is not limited to aircraft propulsion systems equipped with a thrust reverser system.

The inner nacelle structure 36 includes one or more bifurcations 48 and 50, which extend radially through the bypass gas path 40. The upper bifurcation 48 houses and provides an aerodynamic cover for a portion of the pylon structure 26 that is mounted to a core of the gas turbine engine 22.

Figure 2:
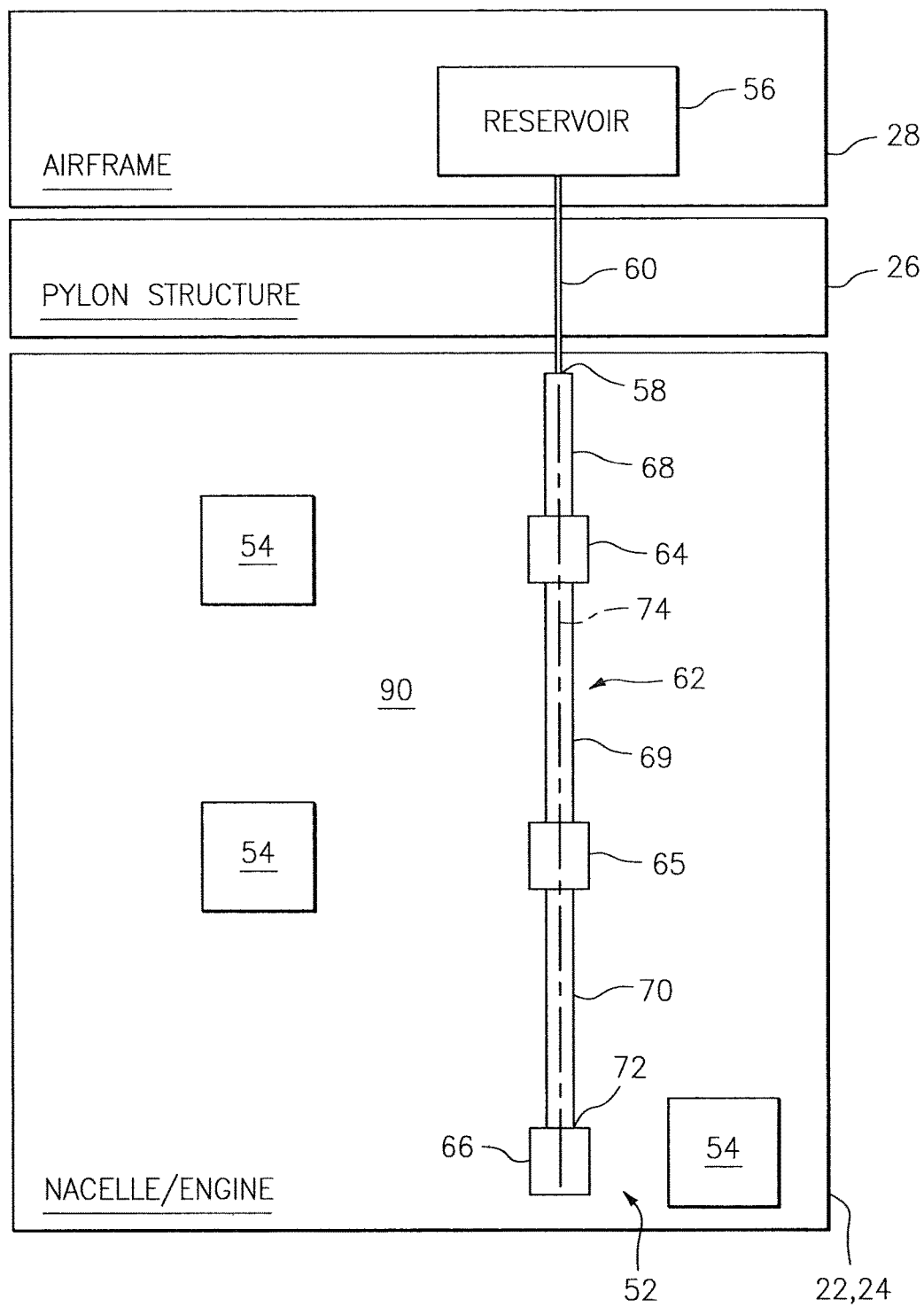
FIG. 2 is a schematic illustration of a fire suppression system configured with an aircraft.

Referring now to FIG. 2, the aircraft propulsion system 20 also includes a fire suppression system 52 housed within the nacelle 24. The fire suppression system 52, for example, may be arranged at least in a cavity formed at least partially by an inner barrel of the inner nacelle structure 36 and/or the bifurcation 48. The fire suppression system 52 is configured to spray and/or otherwise direct fire suppressant onto one or more components 54 of the gas turbine engine 22 (and/or nacelle 24) in order to suppress and/or extinguish a propulsion system fire on, adjacent and/or proximate those components 54. An example of fire suppressant is a fire extinguishing agent such as, but not limited to, inert gas and/or liquid chemical agent; e.g., HALON® gas.

The fire suppression system 52 of FIG. 2 is configured to receive the fire suppressant from a fire suppressant reservoir 56 such as, but not limited to, a tank, a canister, a pressure vessel, etc. The fire suppressant reservoir 56 may be fluidly coupled to an upstream inlet 58 of the fire suppression system 52 by a supply line 60, which may be configured as or otherwise include one or more conduits, pipes, tubes, flexible fluid lines and/or any other structures capable of providing a flowpath for the fire suppressant. The supply line 60 may extend out of the airframe 28, be routed through the pylon structure 26 and extend into the nacelle 24 where, for example, the fire suppressant reservoir 56 is arranged with the airframe 28. The present disclosure, however, is not limited to such an arrangement or element locations. Furthermore, in other embodiments, the supply line 60 and/or the fire suppressant reservoir 56 may be included as part of the fire suppression system 52.

The fire suppression system 52 of FIG. 2 includes a fire suppressant delivery circuit 62 and a plurality of nozzles 64-66. The fire suppressant delivery circuit 62 includes one or more fluid lines 68-70. Each of the fluid lines 68-70 may be configured as or otherwise include one or more conduits, pipes, tubes, flexible fluid lines and/or any other structures capable of providing a flowpath for the fire suppressant. The fire suppressant delivery circuit 62 also includes the upstream inlet 58 and at least one downstream distal (e.g., terminal) end 72. The fluid lines 68-70 of FIG. 2 are arranged and fluidly coupled serially and generally end-to-end such that the fire suppressant delivery circuit 62 extends along a circuit centerline 74 from the upstream inlet 58 to the downstream distal end 72.

Figure 3:
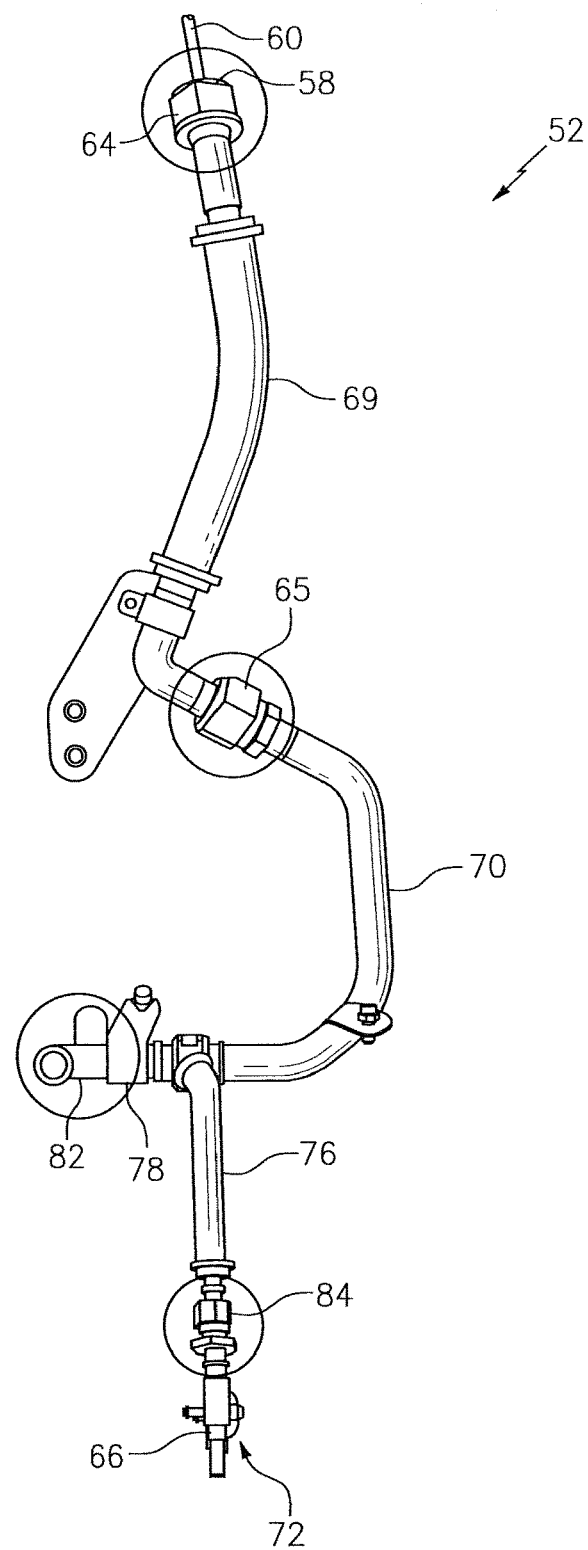
FIG. 3 is a perspective illustration of an alternative fire suppression system.

It is worth noting, while the centerline 74 is shown as substantially straight and linear in FIG. 2, the centerline 74 may alternatively follow a curved, compound, convoluted and/or otherwise non-linear trajectory in other embodiments as shown, for example, in FIG. 3. Furthermore, while the fluid lines 68-70 are serially connected in FIG. 2, some of the fluid lines may alternatively be configured in parallel in other embodiments. Referring to FIG. 3, for example, the fluid lines 76 and 78 may be configured as parallel pigtails, where ends of each of those fluid lines 76, 78 defines a discrete downstream distal end of the fire suppressant delivery circuit 62.

Figure 4:
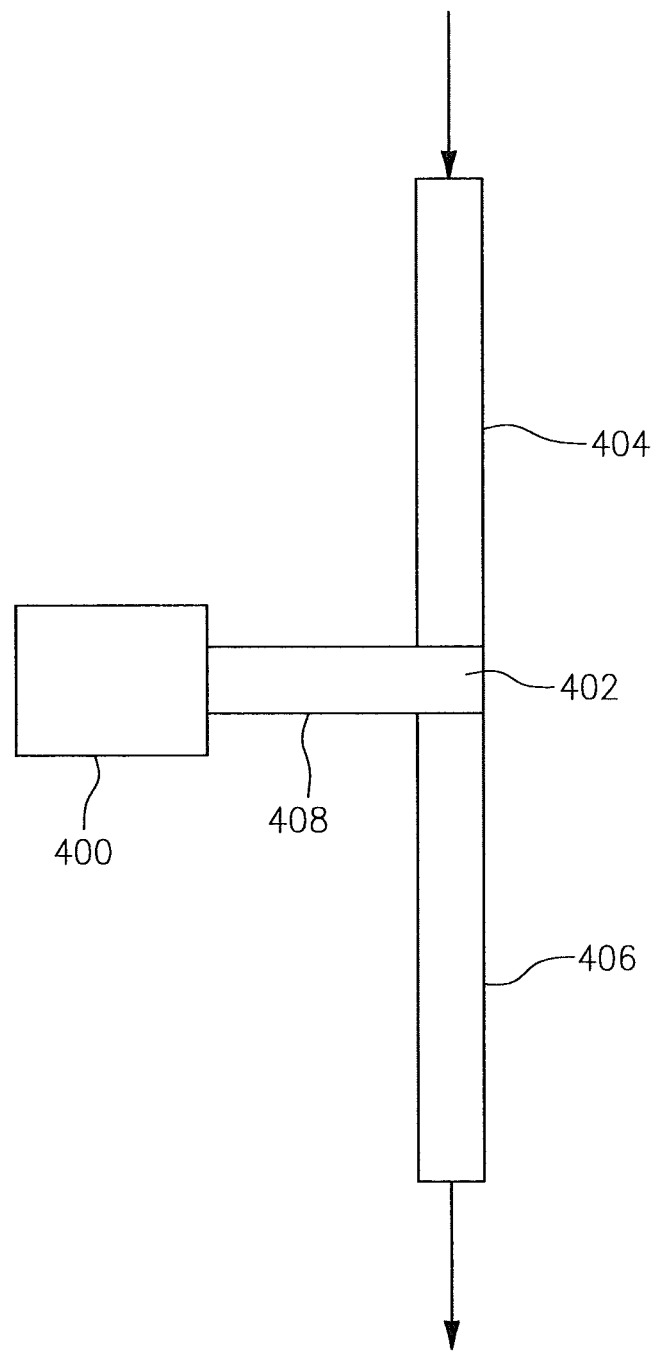
FIG. 4 is a schematic illustration of a fluid circuit segment with a pigtailed nozzle.

Referring again to the exemplary embodiment of FIG. 2, each of the nozzles 64-66 is fluidly coupled inline with the fire suppressant delivery circuit 62. More particularly, the nozzle 64 is fluidly coupled between (and may be directly attached to) a downstream end of the fluid line 68 and an upstream end of the fluid line 69. The nozzle 65 is fluidly coupled between (and may be directly attached to) a downstream end of the fluid line 69 and an upstream end of the fluid line 70. The nozzle 66 is disposed at (e.g., one, adjacent or proximate) the distal downstream end 72 of the fire suppressant delivery circuit 62, and fluidly coupled to (and may be directly attached to) a downstream end of the fluid line 70. In this manner, each of the fire suppression system elements 68, 64, 69, 65, 70 and 66 are serially connected along the circuit centerline 74. By contrast, referring to FIG. 4, where a nozzle 400 is connected to a junction 402 between adjacent fluid lines 404 and 406 by a pigtail 408 or other fluid line, then that nozzle 400 is not fluidly coupled serially inline with the fluid lines 404 and 406, but rather the nozzle 400 is fluidly coupled in parallel with the downstream fluid line 406.

Referring again to FIG. 2, at least one of the nozzles 64 and 65 is configured as a multi-directional nozzle. Of course, in some embodiments, each of the nozzles 64-66 may be configured as a multi-directional nozzle. Alternatively, the nozzle 66 and/or at least one of the nozzles 64 and 65 may each be configured as a single direction nozzle.

Briefly, an example of a single direction nozzle is a nozzle with a single nozzle orifice, which orifice is operable to only direct the fire suppressant out of the nozzle along a single average trajectory. Such a single direction nozzle may be implemented by a discrete device; e.g., a nozzle tip for the fluid line. Alternatively, such a single direction nozzle may be implemented by forming its single nozzle orifice directly in a sidewall or endcap or end plug of/for one of the fluid lines.

Figure 5:
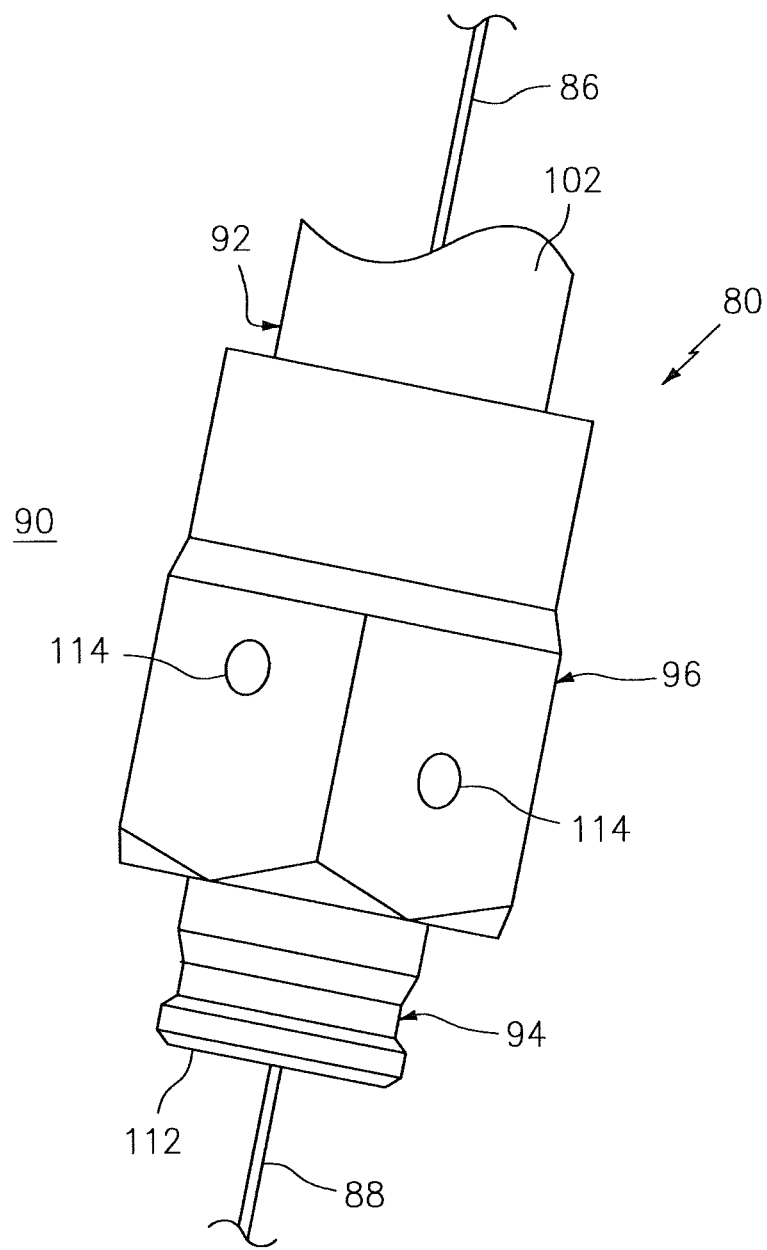
FIG. 5 is an illustration of a multi-directional nozzle configured between fluid lines, which fluid lines are schematically shown.
Figure 6:
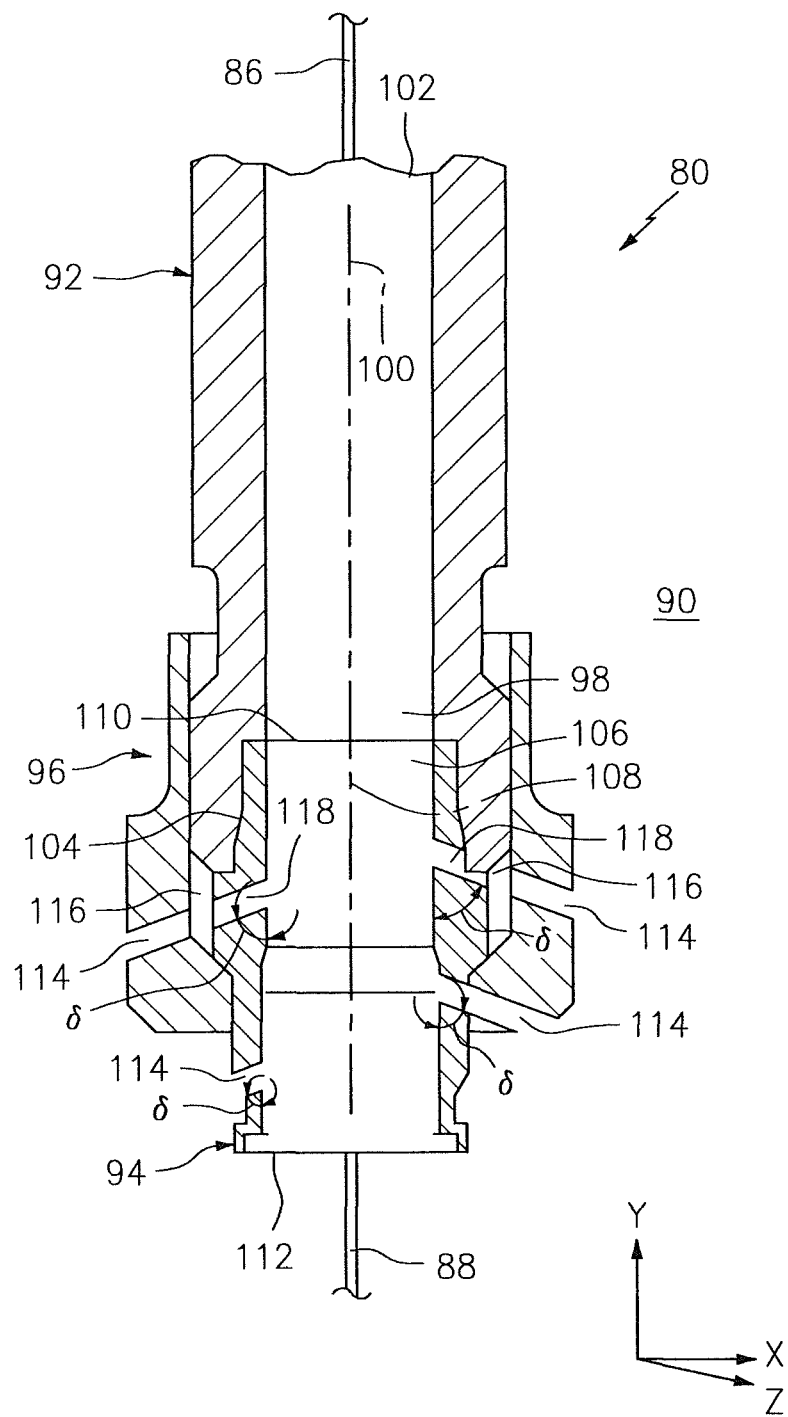
FIG. 6 is a sectional illustration of the multi-directional nozzle and the schematically shown fluid lines of FIG. 5.

FIGS. 5 and 6 illustrate an exemplary embodiment of a multi-directional nozzle 80 (e.g., a multi-directional pass-through nozzle), which may be implemented for one or more of the nozzles 64-66 of FIG. 2 and one or more of the nozzles 64-66, 82 and 84 of FIG. 3. The multi-directional nozzle 80 of FIGS. 5 and 6 is a configured as an attachment joint and fluid pass-through between an upstream fluid line 86 and a downstream fluid line 88. It is worth noting, such a configuration also enables the multi-directional nozzle 80 of FIGS. 5 and 6 to be retrofit into a pre-existing fire suppression system at a joint between adjacent serial fluid lines.

The multi-directional nozzle 80 is configured to deliver a portion of the fire suppressant received from the upstream fluid line 86 in a plurality of directional flows, in response to a fire being detected in the core compartment. Delivering the fire suppressant in the plurality of directional flows may enable the multi-directional nozzle 80 to deliver the fire suppressant to a greater volume within the cavity 90 (e.g., core compartment formed between the nacelle 24 and/or engine 22) compared to a typical single orifice nozzle. The multi-directional nozzle 80 is also configured to route a portion (e.g., more than 50%) of the fire suppressant received from the upstream fluid line 86 to the downstream fluid line 88, which in turn routes that portion of the fire suppressant towards one or more downstream nozzles (not shown in FIGS. 5 and 6).

Referring to FIG. 6, the multi-directional nozzle 80 includes an upstream fitting 92, a downstream fitting 94 and a coupling nut 96. The upstream fitting 92 is configured to fluidly couple the multi-directional nozzle 80 to a downstream end of the upstream fluid line 86. More particularly, the upstream fitting 92 is configured with a cylindrical tubular body with an inner bore 98. This inner bore 98 extends along an axis 100 between an upstream fitting inlet 102 and an upstream fitting outlet 104, where the upstream fitting inlet 102 is fluidly coupled to the downstream end. The upstream fitting 92 may be manufactured from metal such as, for example, a nickel alloy or a nickel chromium alloy, or any other suitable non-metal material.

The downstream fitting 94 is configured to interface with the upstream fitting 92 to and fluidly couple the multi-directional nozzle 80 to an upstream end of the downstream fluid line 88. More particularly, the downstream fitting 94 is configured with a cylindrical tubular body with an inner bore 106. This inner bore 106 extends along an axis 108 between a downstream fitting inlet 110 and a downstream fitting outlet 112, which is fluidly coupled to the upstream end of the downstream fluid line 88. The downstream fitting inlet 110 is configured to interface with (e.g., project into) and thereby be fluidly coupled with the upstream fitting outlet 104. The downstream fitting 94 may be manufactured from metal such as, for example, a nickel alloy or a nickel chromium alloy, or any other suitable non-metal material.

The downstream fitting 94 is mechanically coupled to the upstream fitting 92 by the coupling nut 96. This coupling nut 96 enables the downstream fitting 94 to be removably attached to the upstream fitting 92. As discuss below in further detail, this removable attachment enables at least the coupling nut 96 to be swapped out for an alternative nut with a different number and/or different arrangement of nozzle orifices 114.

The upstream fitting 92, the downstream fitting 94 and the coupling nut 96 may define a cavity 116 (e.g., an annulus) therebetween. This cavity 116 fluidly couples the nozzle orifices 114 in the coupling nut 96 to the inner bore 106. More particularly, the cavity 116 fluidly couples the nozzle orifices 114 to one or more supply orifices 118 in the downstream fitting 94, which in turn are fluidly coupled with the inner bore 106.

The nozzle orifices 114 may be arranged in an array circumferentially about the coupling nut 96. All of the nozzle orifices 114 in this array may be axially aligned along the axis 100, 108, or arranged at slightly different axial locations as shown in FIGS. 5 and 6. While the nozzle orifices 114 are describes as being arranged about the circumference of the coupling nut 96, in alternative embodiments the nozzle orifices 114 may be concentrated in a certain circumferential sector; e.g., only on one quarter, half, etc. of the coupling nut 96.

The nozzle orifices 114 may be respectively collinear (circumferentially and/or axially aligned) with the supply orifices 118 in the downstream fitting 94 as generally shown in FIG. 6. However, in other embodiments, the nozzle orifices 114 may be non-collinear with (e.g., circumferentially and/or axially offset from) the supply orifices 118. In this manner, the fire suppressant may be more equally distributed and substantially equally pressurized within the cavity 116 before flowing into the nozzle orifices 114, which may enable more equal fire suppressant flow through the nozzle orifices 114. Of course, the fire suppressant flow may be individually tailored for each nozzle orifice 114 by, for example, providing the nozzle orifices 114 with different diameters, shaped, etc.

Figure 7:
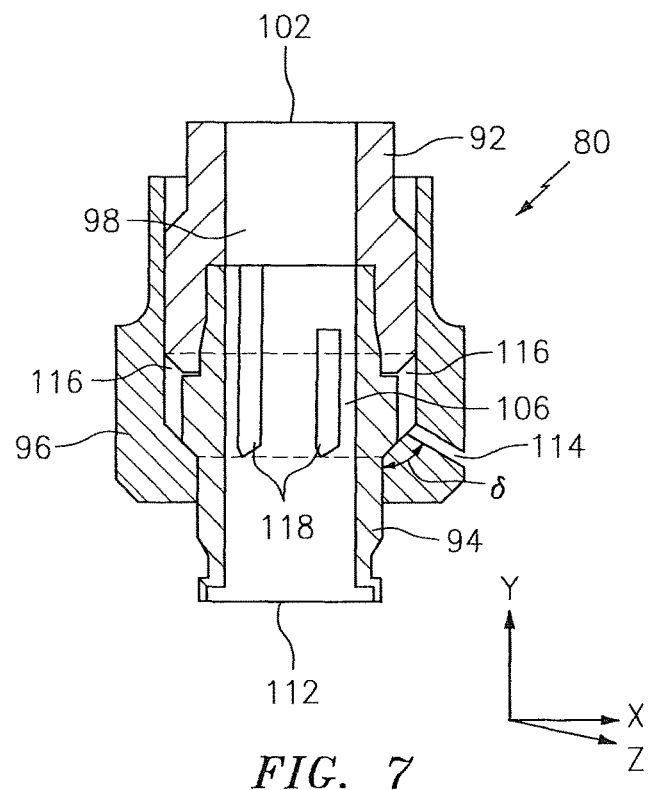
FIGS. 7 and 8 are sectional illustration of alternative multi-directional nozzles.

The nozzle orifices 114 and the supply orifices 118 may be configured to provide the multi-directional nozzle 80 with a high or low aspect ratio. For example, in the embodiment of FIG. 7, the multi-directional nozzle 80 has a high aspect ratio since the supply orifices 118 are configured with a larger flow area than the nozzle orifices 114. This enables pressure of the fire suppressant within the cavity 116 to increase and thereby supply the nozzle orifices 114 with higher pressure fire suppressant. By contrast, referring again to FIG. 6, the multi-directional nozzle 80 has a lower aspect ratio since the supply orifices 118 and the nozzle orifices 114 have substantially the same flow areas.

The nozzle orifices 114 may have any suitable size and shape. For example, one or more of the nozzle orifices 114 may each have a circular, oval, rectangular, and/or any other suitable cross-sectional shape. The nozzle orifices 114 may also comprise any suitable size, dependent on the amount of fire suppressant to be delivered. For example, larger gas turbine engines may require a greater amount of fire suppressant compared to smaller gas turbine engines.

The nozzle orifices 114 may oriented along the x-axis and the z-axis away from the axis 108 of the inner bore 106. More particularly, the nozzle orifices 114 may be oriented at a directional flow angle delta ("δ") relative to the axis 108. This directional flow angle δ may be between about zero degrees (0°) to about five degrees (5°), between about five degrees (5°) to about fifteen degrees (15°), between about fifteen degrees (15°) to about thirty degrees (30°), between about thirty degrees (30°) to about sixty degrees (60°), or between about sixty degrees (60°) to about ninety degrees (90°); e.g., where the term "about" in this context may refer to +/−2° variation. In some embodiments, each nozzle orifice 114 may have a different directional flow angle δ as shown in FIG. 8.

Figure 8:
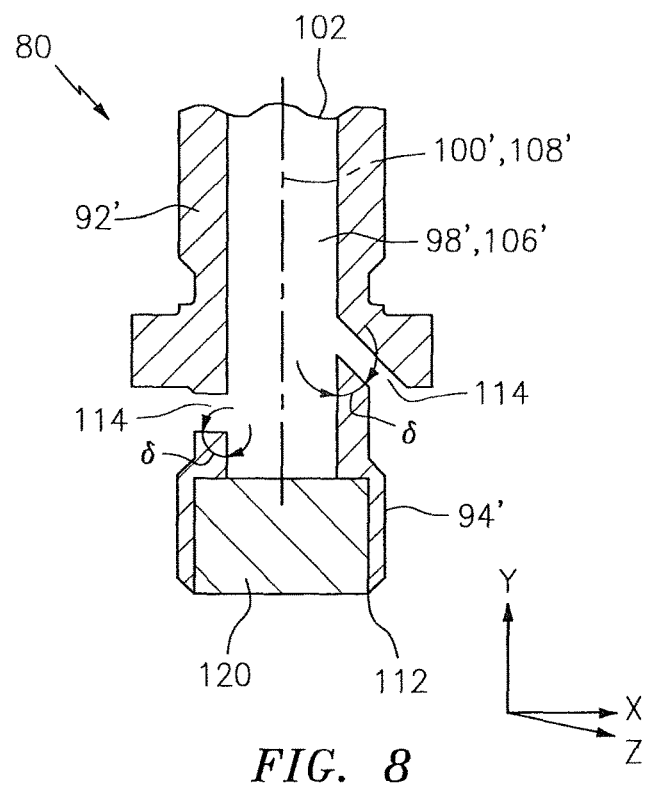

Referring still to FIG. 8, in some embodiments, the multi-directional nozzle 80 may be configured with a unitary body. For example, upstream and downstream fitting portions 92' and 94' may be configured as a unitary body. This in turn obviates the need for the coupling nut 96.

Figure 9:
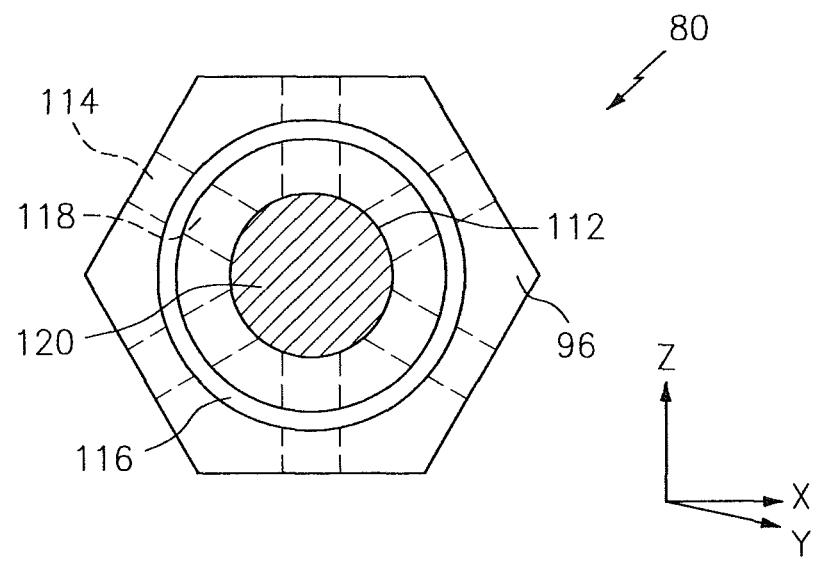
FIG. 9 is an end view illustration of the multi-directional nozzle of FIG. 8, where nozzle and supply orifices are shown via dashed lines.
Figure 10:
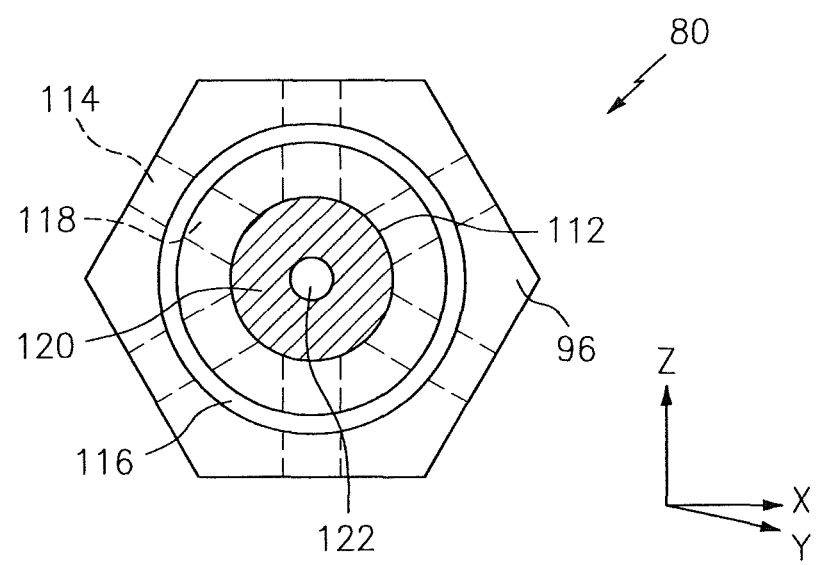
FIG. 10 is an end view illustration of an alternative multi-directional nozzle, where nozzle and supply orifices are shown via dashed lines.

In some embodiments, the multi-directional nozzle 80 may include a plug 120 as shown in FIGS. 8, 9 and 10 where that nozzle 80 is located at the distal downstream end 72 (see FIG. 2). The plug 120 is arranged within the inner bore 106 (106') of the downstream fitting 94 at the downstream fitting outlet 112. When the plug 120 is configured as a solid plug as shown in FIG. 9, the plug 120 prevents the flow of fire suppressant out of the downstream fitting outlet 112. Alternatively, as shown in FIG. 10, the plug 120 may include a nozzle orifice 122. While the plugs are described above and illustrated in the drawings as discrete elements, the plug 120 can alternatively be formed as an integral part of the downstream fitting 94 in other embodiments.

Figure 11:
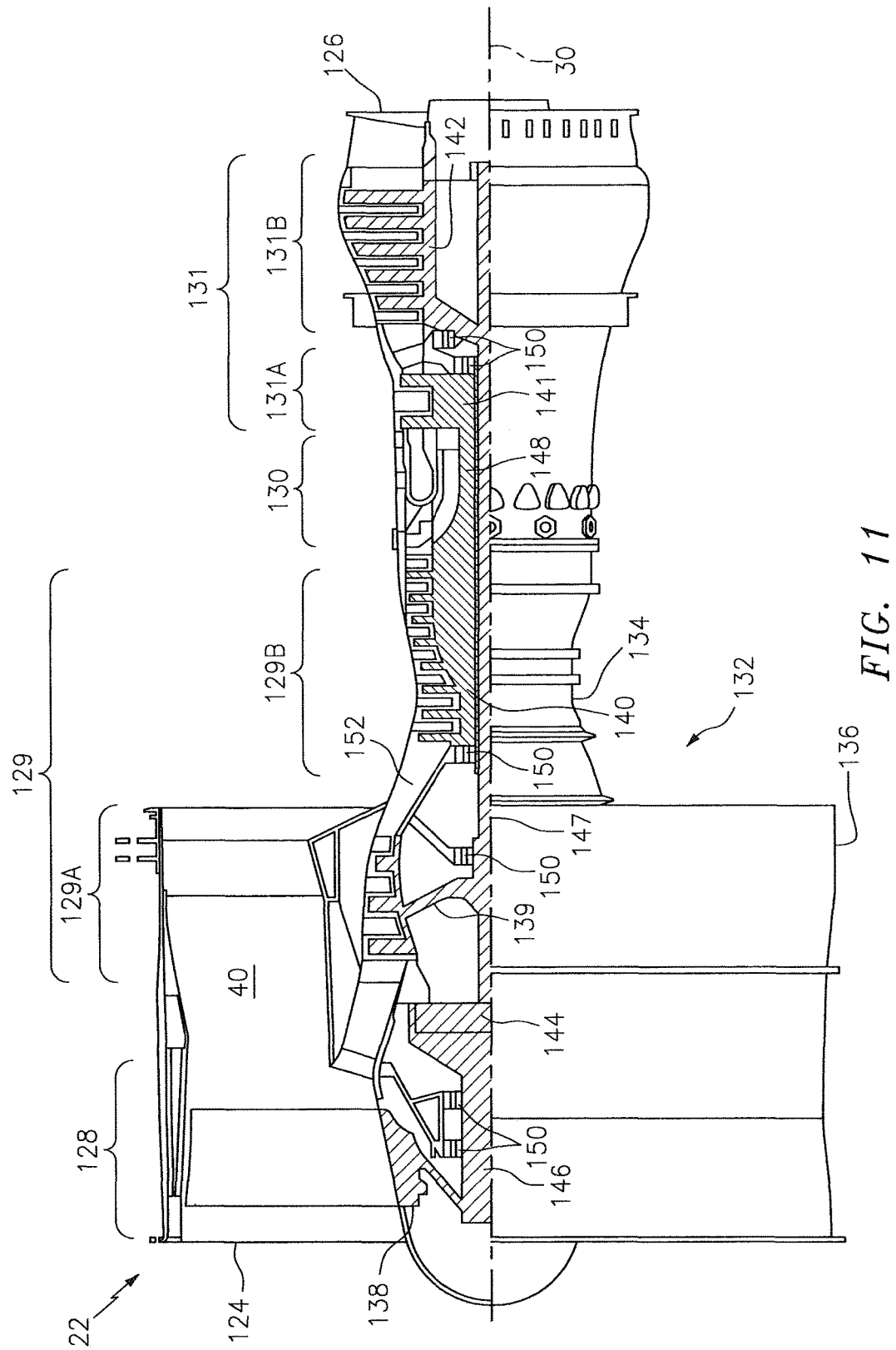
FIG. 11 is a side cutaway illustration of a gas turbine engine for the aircraft propulsion system of FIG. 1.

FIG. 11 is a side cutaway illustration of the gas turbine engine 22 for the aircraft propulsion system 20 of FIG. 1. This turbine engine 22 of FIG. 11 is configured as a geared turbofan gas turbine engine. The turbine engine 22 extends along the axial centerline 30 between an upstream airflow inlet 124 and a downstream airflow exhaust 126. The turbine engine 22 includes a fan section 128, a compressor section 129, a combustor section 130 and a turbine section 131. The compressor section 129 includes a low pressure compressor (LPC) section 129A and a high pressure compressor (HPC) section 129B. The turbine section 131 includes a high pressure turbine (HPT) section 131A and a low pressure turbine (LPT) section 131B.

The engine sections 128-131 are arranged sequentially along the axial centerline 30 within an engine housing 132. This housing 132 includes an inner engine case 134 (e.g., a core case) and an outer engine case 136 (e.g., a fan case). The inner engine case may house one or more of the engine sections 129-131; e.g., an engine core. The inner engine case 134 is at least partially housed within the inner nacelle structure 36 (see FIG. 1). The outer engine case 136 may house at least the fan section 128. The outer engine case 136 is at least partially housed within the outer nacelle structure 38 (see FIG. 1).

Each of the engine sections 128, 129A, 129B, 131A and 131B includes a respective rotor 138-142. Each of these rotors 138-142 includes a plurality of rotor blades arranged circumferentially around and connected to one or more respective rotor disks. An annular array of the rotor blades, for example, may be formed integral with or mechanically fastened, welded, brazed, adhered and/or otherwise attached to each respective rotor disk.

The fan rotor 138 is connected to a gear train 144, for example, through a fan shaft 146. The gear train 144 and the LPC rotor 139 are connected to and driven by the LPT rotor 142 through a low speed shaft 147. The HPC rotor 140 is connected to and driven by the HPT rotor 141 through a high speed shaft 148. The shafts 146-148 are rotatably supported by a plurality of bearings 150. Each of these bearings 150 is connected to the engine housing 132 by at least one stationary structure such as, for example, an annular support strut.

During operation, air enters the gas turbine engine 22 through the airflow inlet 124. This air is directed through the fan section 128 and into an annular core gas path 152 and the annular bypass gas path 40. The core gas path 152 extends sequentially through the engine sections 129-131. The air within the core gas path 152 may be referred to as "core air". The air within the bypass gas path 40 may be referred to as "bypass air". This air is referred to as "bypass air" since the bypass gas path 40 extends outside of and thereby bypasses the engine core.

The core air is compressed by the compressor rotors 139 and 140 and directed into a combustion chamber of a combustor in the combustor section 130. Fuel is injected into the combustion chamber and mixed with the compressed core air to provide a fuel-air mixture. This fuel air mixture is ignited and combustion products thereof flow through and sequentially cause the turbine rotors 141 and 142 to rotate. The rotation of the turbine rotors 141 and 142 respectively drive rotation of the compressor rotors 140 and 139 and, thus, compression of the air received from a core airflow inlet. The rotation of the turbine rotor 142 also drives rotation of the fan rotor 138, which propels the bypass air through and out of the bypass gas path 40. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

The fire suppression system 52 may be arranged with various turbine engines other than the one described above. The fire suppression system 52, for example, may be included in a geared turbine engine where a gear train connects one or more shafts to one or more rotors in a fan section, a compressor section and/or any other engine section. Alternatively, the fire suppression system 52 may be included in a turbine engine configured without a gear train. The fire suppression system 52 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. Furthermore, the turbine engine may be configured for non-aero application; e.g., an industrial gas turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A fire suppression system for a gas turbine engine, comprising:
    a fire suppressant delivery circuit including and extending between an upstream inlet and a downstream distal end;
    a first nozzle fluidly coupled with the fire suppressant delivery circuit and disposed at the downstream distal end; and
    a multi-directional nozzle fluidly coupled with the fire suppressant delivery circuit and configured serially inline between the upstream inlet and the first nozzle, the multi-directional nozzle including:
        a tubular upstream fitting including an upstream fitting inlet and an upstream fitting outlet, wherein the upstream fitting inlet is fluidly coupled with the upstream inlet of the fire suppressant delivery circuit;
        a tubular downstream fitting including a downstream fitting inlet and a downstream fitting outlet that is fluidly coupled with the first nozzle;
        a coupling nut configured to attach the downstream fitting to the upstream fitting, wherein the downstream fitting inlet is fluidly coupled with the upstream fitting outlet; and
        a plurality of nozzles orifices extending through the coupling nut, wherein each of the nozzle orifices is fluidly coupled with an inner bore of the multi-directional nozzle.

2. The fire suppression system of claim 1, wherein
    the fire suppressant delivery circuit includes a first fluid line and a second fluid line;
    the multi-directional nozzle is fluidly coupled between a downstream end of the first fluid line and an upstream end of the second fluid line; and
    the first nozzle is fluidly coupled with a downstream end of the second fluid line.

3. The fire suppression system of claim 2, wherein the multi-directional nozzle is configured as a pass-through joint between and is attached to the first fluid line and the second fluid line.

4. The fire suppression system of claim 1, wherein the first nozzle is configured as a multi-directional nozzle.

5. The fire suppression system of claim 1, wherein the first nozzle is configured as a single direction nozzle.

6. The fire suppression system of claim 1, further comprising a third nozzle fluidly coupled with the fire suppressant delivery circuit and configured serially inline between the multi-directional nozzle and the first nozzle.

7. The fire suppression system of claim 6, wherein the third nozzle is configured as a multi-directional nozzle.

8. The fire suppression system of claim 1, further comprising a third nozzle fluidly coupled with the fire suppressant delivery circuit, wherein the third nozzle is configured downstream of the multi-directional nozzle and in parallel with the first nozzle.

9. The fire suppression system of claim 1, wherein the multi-direction nozzle is disposed within a cavity; and
    each of the nozzle orifices is configured to direct fire suppressant out of the multi-direction nozzle and into the cavity along a discrete trajectory.

10. The fire suppression system of claim 1, wherein the inner bore is formed by the downstream fitting and extends between the downstream fitting inlet and the downstream fitting outlet.

11. The fire suppression system of claim 1, wherein a first of the nozzle orifices is oriented at an angle between about five degrees and about ninety degrees relative to a longitudinal centerline of the inner bore.

12. The fire suppression system of claim 1, wherein an annulus is formed between the downstream fitting and the coupling nut, and the annulus is fluidly coupled between the nozzle orifices and the inner bore.

13. An assembly of a fire suppression system for a gas turbine engine, the fire suppression system comprising a first fluid line and a second fluid line, the assembly comprising:
    a multi-directional pass-through nozzle including a tubular upstream fitting, a tubular downstream fitting, a coupling nut and a plurality of nozzle orifices;
    the upstream fitting including an upstream fitting inlet and an upstream fitting outlet, wherein the upstream fitting inlet is configured to be fluidly coupled with and receive fire suppressant from the first fluid line;
    the downstream fitting including a downstream fitting inlet and a downstream fitting outlet, wherein the downstream fitting outlet is configured to be fluidly coupled with and provide a portion of the fire suppressant to the second fluid line;
    the coupling nut attaching the downstream fitting to the upstream fitting, wherein the downstream fitting inlet is fluidly coupled with the upstream fitting outlet; and
    the nozzle orifices extending through the coupling nut, wherein each of the nozzle orifices is fluidly coupled with an inner bore of the multi-directional nozzle.

14. The assembly of claim 13, wherein the inner bore is formed by the downstream fitting and extends between the downstream fitting inlet and the downstream fitting outlet.

15. The assembly of claim 13, wherein a first of the nozzle orifices is oriented at an angle between about five degrees and about ninety degrees relative to a longitudinal centerline of the inner bore.

16. The assembly of claim 13, wherein an annulus is formed between the downstream fitting and the coupling nut, and the annulus is fluidly coupled between the nozzle orifices and the inner bore.

17. An assembly comprising:
    a gas turbine engine; and
    a fire suppression system including a fire suppressant delivery circuit, a first nozzle and a multi-directional nozzle, wherein the first nozzle and the multi-directional nozzle are configured to direct fire suppressant towards components of the gas turbine engine;
    the fire suppressant delivery circuit including and extending between an upstream inlet and a downstream distal end;
    the first nozzle fluidly coupled with the fire suppressant delivery circuit and disposed at the downstream distal end; and
    the multi-directional nozzle fluidly coupled with the fire suppressant delivery circuit and configured between the upstream inlet and the first nozzle.

18. The assembly of claim 17, further comprising:
    a nacelle configured to house the gas turbine engine; and a pylon structure configured to attach the gas turbine engine and the nacelle to an airframe of an aircraft;

wherein the gas turbine engine comprises a turbofan engine or a turbojet engine, and wherein the fire suppression system is disposed at least within a cavity formed between the nacelle and the gas turbine engine.

19. The assembly of claim 17, wherein the multi-directional nozzle includes:

a tubular upstream fitting including an upstream fitting inlet and an upstream fitting outlet, wherein the upstream fitting inlet is fluidly coupled with the upstream inlet of the fire suppressant delivery circuit;

a tubular downstream fitting including a downstream fitting inlet and a downstream fitting outlet that is fluidly coupled with the first nozzle;

a coupling nut configured to attach the downstream fitting to the upstream fitting, wherein the downstream fitting inlet is fluidly coupled with the upstream fitting outlet; and a plurality of nozzle orifices extending through the coupling nut, wherein each of the nozzle orifices is fluidly coupled with an inner bore of the multi-directional nozzle.

\* \* \* \* \*